March 26, 1968  B. G. BOWDEN  3,375,024
BICYCLE FRAME

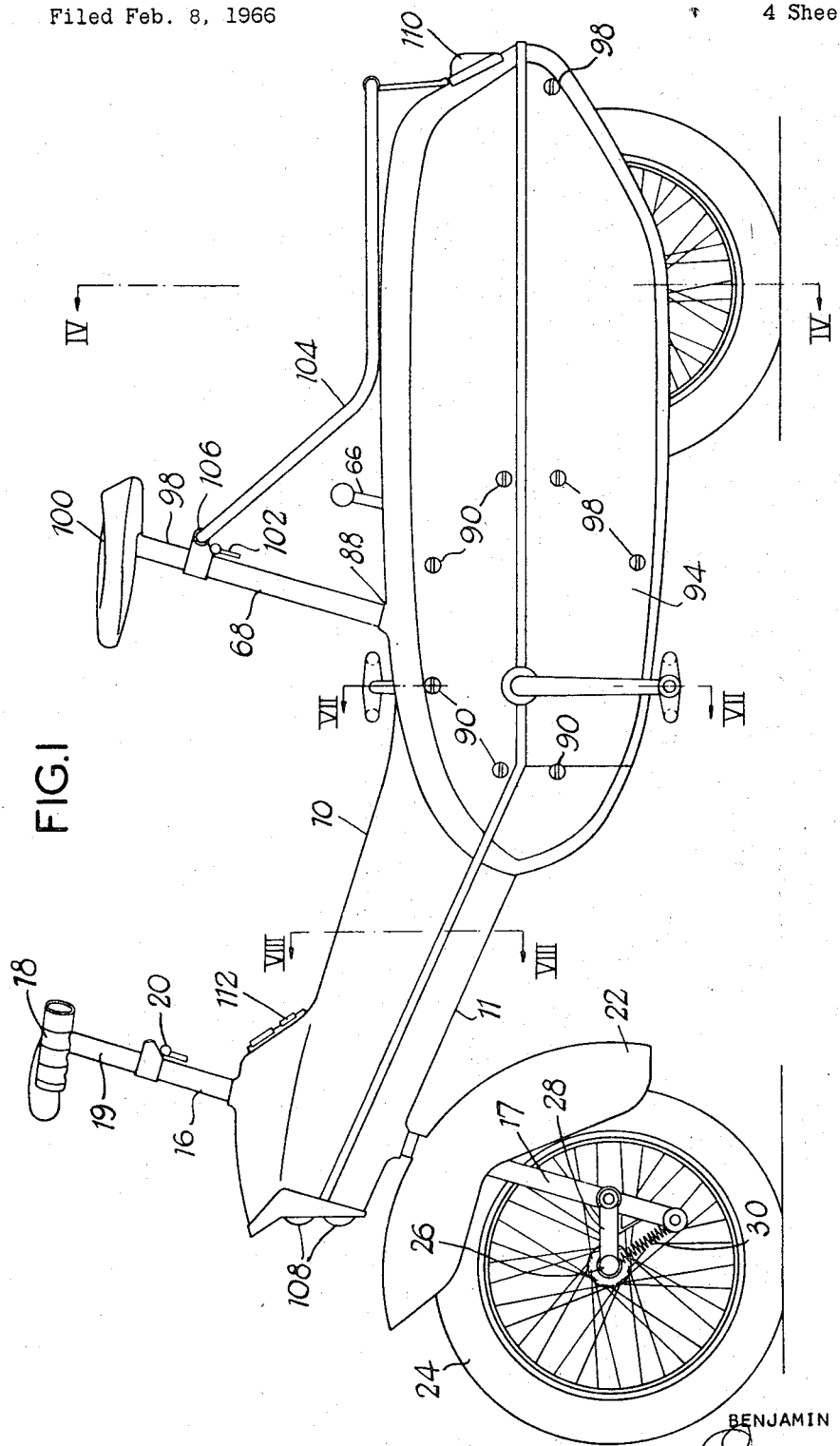

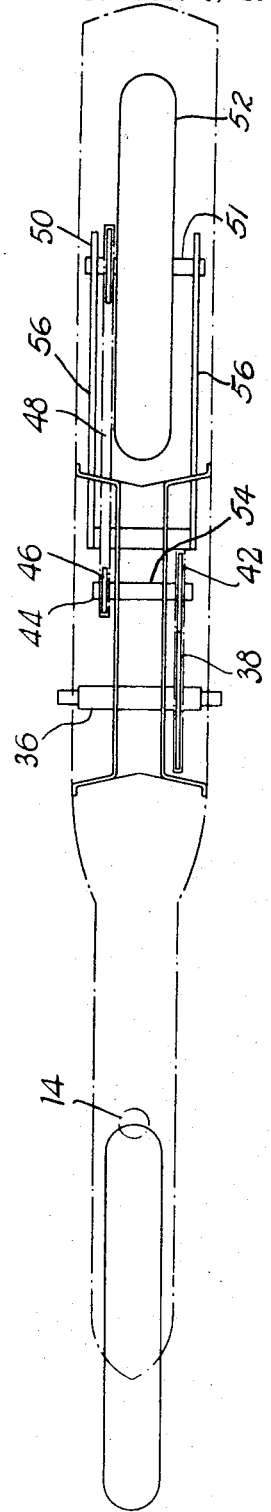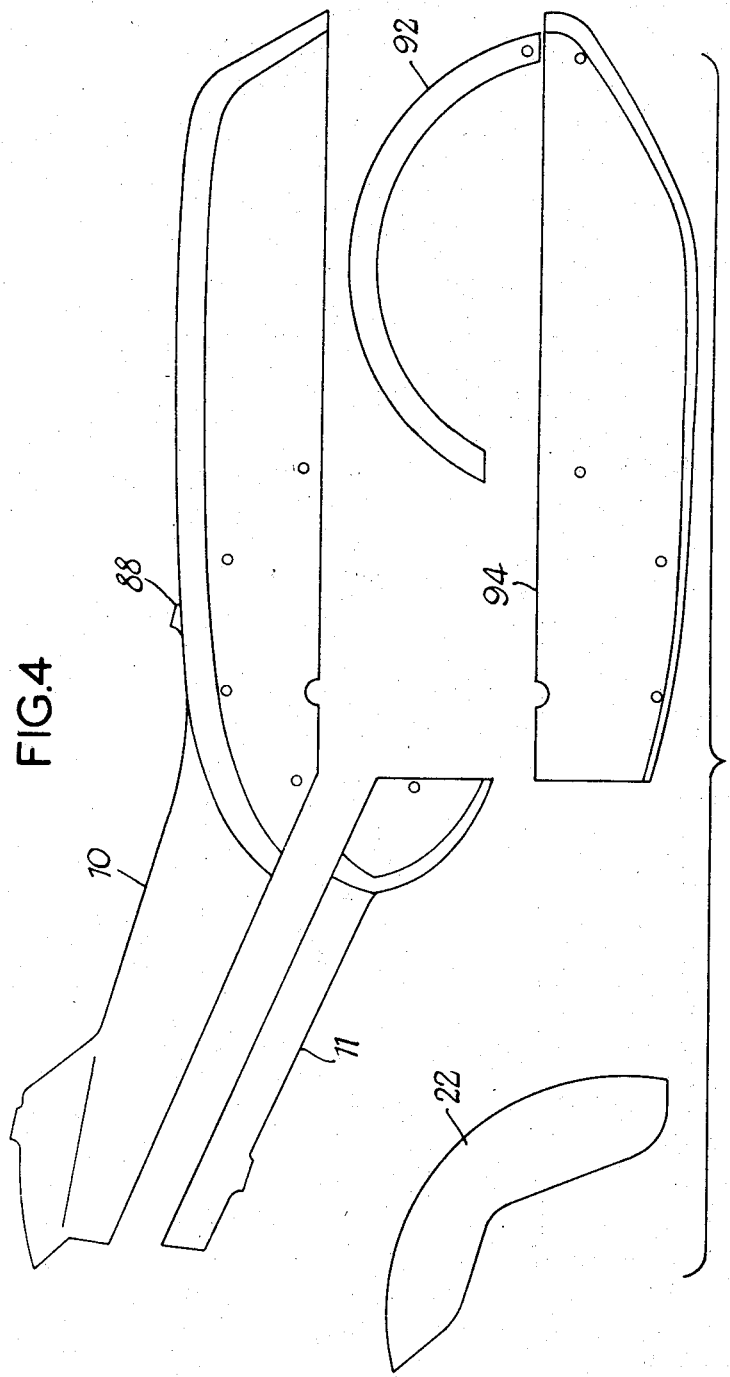

Filed Feb. 8, 1966  4 Sheets-Sheet 3

INVENTOR
BENJAMIN GEORGE BOWDEN
BY Owen & Owen
ATTORNEYS

March 26, 1968 B. G. BOWDEN 3,375,024
BICYCLE FRAME
Filed Feb. 8, 1966 4 Sheets-Sheet 4
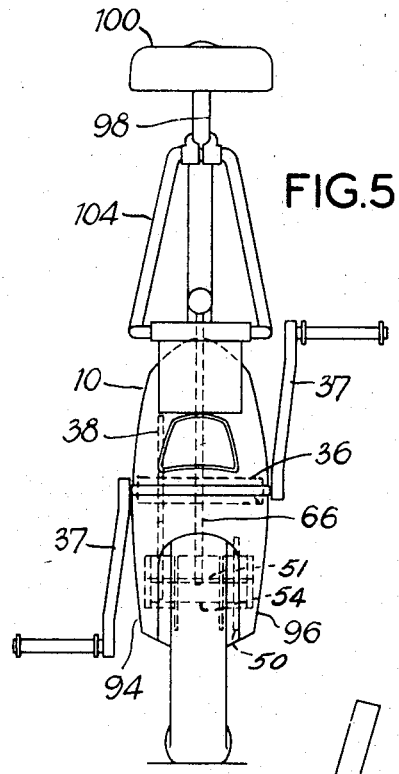
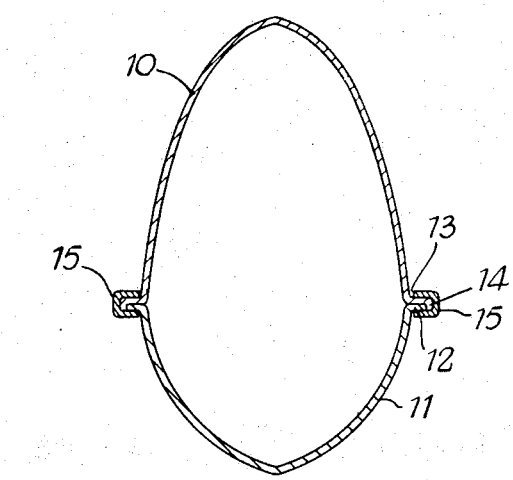
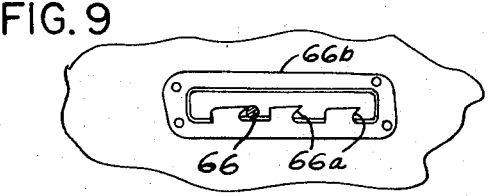
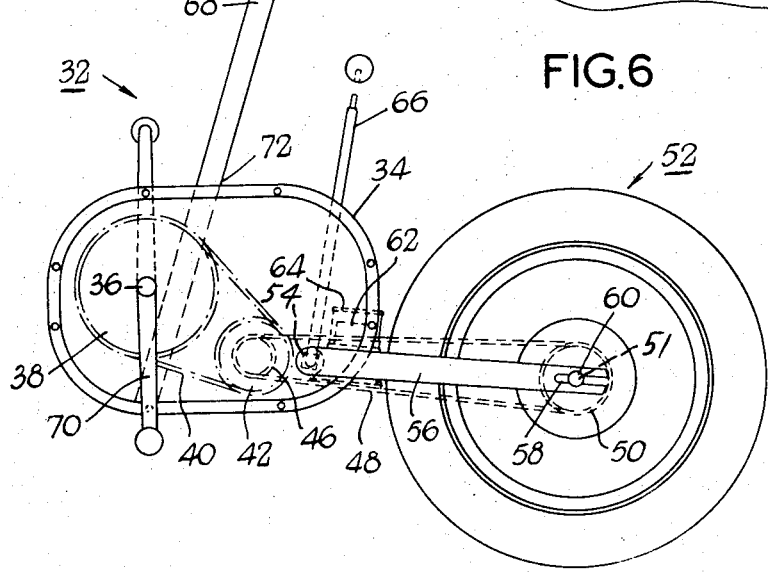
INVENTOR
BENJAMIN GEORGE BOWDEN
BY Owen & Owen
ATTORNEYS

United States Patent Office 3,375,024
Patented Mar. 26, 1968

3,375,024
BICYCLE FRAME
Benjamin George Bowden, Export, Pa., assignor to
Mary Nora (Noreen) Bowden
Filed Feb. 8, 1966, Ser. No. 525,885
8 Claims. (Cl. 280—281)

ABSTRACT OF THE DISCLOSURE

A bicycle having a frame which includes an elongated upper member of inverted U-shaped cross section. A front wheel assembly including the wheel fork and steering post is supported in the front end of the upper frame member, and a mechanism unit is secured within the U-shaped upper frame member near its center. The mechanism unit has a separate housing and mounts therein a drive sprocket, a saddle post and a horizontally extending torsion bar. A rearwardly extending rear wheel suspension fork is carried by the torsion bar and a rear wheel and sprocket are mounted in the rear end of the suspension fork. Lower frame members extend across between the edges of the U-shaped upper frame member at the part of the frame located forwardly of the mechanism unit and downwardly from the rear part of the frame to enclose the mechanism unit and partially enclose the rear wheel.

---

The present invention relates to an improved bicycle. More particularly it relates to an improved lightweight bicycle frame comprised of preformed lightweight shells which are joined to form a unitary hollow frame into which a transmission unit is attached.

According to the invention there is provided a bicycle comprising a frame, a front wheel pivotably supported at the front end of the frame characterized by a rear wheel suspension and transmission system combined in a unitary housing which is releasably secured to the frame.

Preferably the frame is in the form of an elongate hollow shell comprising an upper shell member of inverted U-shaped cross section being bonded along part of its length to a lower shell member, the unitary housing being secured to the interior of the upper shell member.

Preferably also the rear wheel transmission comprises a pedal spindle rotatably supported transversely of the housing carrying a drive pedal at each end and a primary chain wheel at one end, the primary chain wheel being drivingly connected by a first drive chain to a primary drive sprocket carried on one end of a secondary spindle which is rotatably supported transversely of the housing, the other end of the secondary spindle carrying a secondary chain wheel which is drivingly connected by a second drive chain to a final drive sprocket drivingly connected to the rear wheel.

Preferably also the rear wheel suspension comprises a pair of trailing links each secured at one end to either end of the rear wheel spindle and each secured at the other end to either end of a torsion bar, extending transversely of the housing, the center of the bar being rigidly fixed to the housing.

Figure 3:
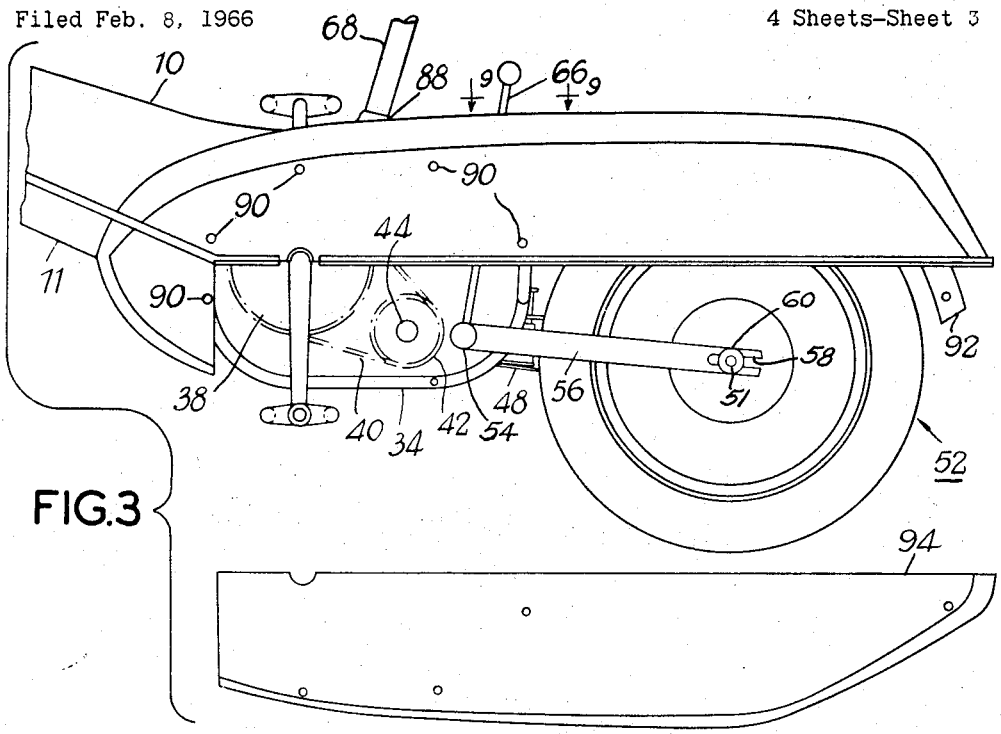
Figure 7:
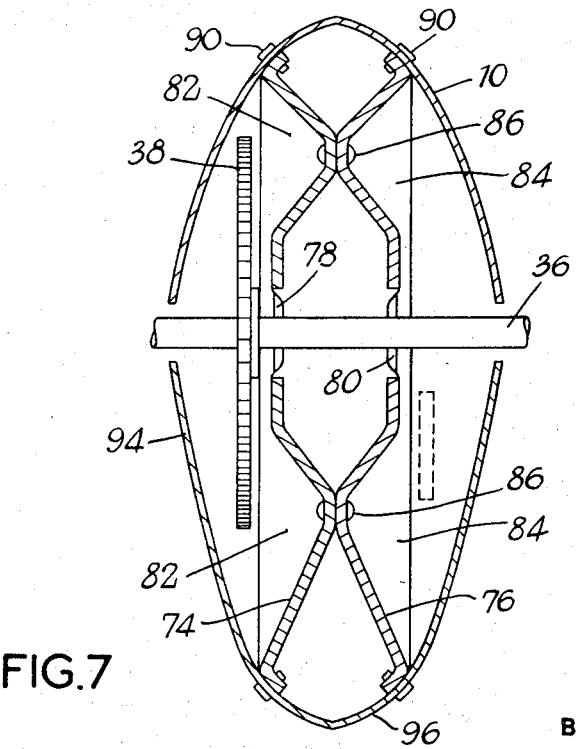

Preferred embodiments of the invention will now be described with reference to the accompanying drawings in which:

FIGURE 1 is a side view of a bicycle;
FIGURE 2 is a view of the various body shell members of the bicycle shown in FIGURE 1;
FIGURE 3 is a side view of part of the partially assembled bicycle;
FIGURE 4 is a top sectional view of the bicycle shown in FIGURE 1;
FIGURE 5 is a cross section taken along the line IV—IV of FIGURE 1;
FIGURE 6 is a side view of the bicycle rear suspension and driving mechanism;
FIGURE 7 is a section taken along the line VII—VII of FIGURE 1; and
FIGURE 8 is a section taken along the line VIII—VIII of FIGURE 1.
FIGURE 9 is a fragmentary plan view on a slightly enlarged scale of a multi-positioned device for adjusting the bias on the rear wheel suspension means.

The main frame of the bicycle consits of a top shell 10 which is joined at its front lower end to a lower shell 11, both shells 10 and 11 being of U-shaped cross section.

Both shells 10 and 11 are preferably made of resin bonded fiberglass, and are joined together as shown in FIGURE 8. The lower shell 11 has an outwardly flaring abutment face 12 which is adjacent an abutment face 13 on the top shell 10. The abutment face 13 has a flange 14 which extends at right angles from it to form a seat into which the other abutment face 12 snugly fits. The flange 14 projects over the outer edge of the adjacent abutment face on each side of the frame. A channel member 15 covers the adjacent abutment faces 12 and 13. This channel member may be also of resin bonded fiberglass or of some different material such as stainless steel or chromium plated metal. The adjacent surfaces of the abutment faces 12 and 13 and the channel member 15 are coated with appropriate adhesive and the whole assembled as described above. When so bonded the abutment faces 12 and 13 and the channel member 15 constitute a reinforcing bar which extends longitudinally on either side of the front of the frame. A steering post 16 is rotatably supported in the top and lower shells and has a pair of forks 17 at its lower end, the upper end carrying a pair of handle bars 18. In the embodiment shown the steering post 16 is telescopic, having a section 19 slidable in the main post and lockable at any position by means of a quick release lock 20.

A front mud-guard 22 is attached to the steering post 16 in the usual manner.

A front wheel 24 is rotatably mounted on a front spindle 26 which is carried by a pair of locating arms 28 which are pivotally mounted on each of the forks 17. A pair of tension springs 30 join the front ends of the arms 28 to the lower ends of the forks 17. The front wheel is thus resiliently supported.

A transmission unit illustrated generally at 32 in FIGURE 6, is joined to the main frame of the bicycle. This transmission unit comprises a housing 34 rotatably supporting a pedal spindle 36 supporting pedals 37, and which carries a primary chain wheel 38 which is drivingly connected by way of chain 40 to primary drive sprocket 42 which is carried at one end of a secondary spindle 44 which is also rotatably supported in the housing 34. A secondary chain wheel 46, which is mounted at the other end of the secondary spindle 44, is drivingly connected by way of a chain 48, to a final drive sprocket 50 mounted on a rear wheel drive spindle 51. This rear wheel drive spindle may contain a variable speed hub gear.

A rear wheel 52 to which the spindle 51 is attached by way of well known hub and freewheel arrangement, is resiliently supported by way of a torsion bar and trailing link suspension.

A torsion bar 54 extends across the housing 34 being rotatably mounted in each of the two contituent members 74 and 76 which are described in more detail below. To each of the free ends of the bar 54 which extend beyond the housing 34, is rigidly secured a rearwardly extending trailing link 56, to the far ends of which the wheel 52 is rotatably mounted. The ends of the spindle 51 are threaded and engage in slots 58 in the links 56, and nuts 60 which are carried by the threaded ends of the spindle 51, are then screwed down to hold the spindle firmly in position in the slots 58.

The center of the torsion bar 54 is rigidly secured to an upwardly extending lever 66, which may be firmly locked at its upper end, in the upper shell 10. The weight of a rider sitting on the bicycle causes the links 56 to pivot in an anticlockwise direction about the spindle 51, thus twisting the two ends of the torsion bar 54 relative to its fixed center, by an amount such that the torsional restoring force balances the torque produced by the weight of the rider.

The upper limit of movement of the links 56 is controlled by rubber blocks 62 which are mounted on the links 56 and which come up against stops 64 which are rigidly fixed to the housing 34. If the travel of the links 56 were not limited in this way, the wheel 52 might catch on the inside of the frame, with possible dangerous consequences.

To allow persons of widely varying weights to use the bicycle, the lever 66 can be locked in a variety of angular positions by any simple multi-position device, for example, by selective engagement of the lever 66 with any one of several catches 66a of a retainer plate 66b that is mounted on the top center of the shell 10 (FIG. 9).

In known small wheel bicycles where a trailing link suspension is used for the rear wheels, a chain wheel is directly connected to the final drive sprocket as in a conventional large diameter wheel bicycle. In order to prevent the undue variation in the tension of the chain, the axis of rotation of the chain wheel is put as close as possible to the pivot point of the trailing links. This means that the pedals are close to the ground and difficulty is experienced when cornering, in that the pedals often strike the ground as the bicycle leans over to take the corner. This disadvantage is overcome in the present arrangement, by employing the secondary spindle and chain wheel which is positioned close to the pivot of the trailing links, and using the primary chain wheel which may now be positioned higher from the ground.

A saddle post 68 is also held in the housing 34, being firmly fixed at its lower end 70 and at the point 72 where it extends out of the housing.

As shown in FIGURE 7 the housing 34 is formed from two members 74 and 76 which are made, preferably, from resin bonded fiberglass. These two members are mirror images of each other and are formed with depressions around the points where the spindles 36 and 44 pass through the housing, so as to strengthen the housing at those points. As shown in FIGURE 7 the shaft 36 is supported by bearings 78 and 80. The member 74 is formed with a circular depression 82, a similar depression 84 being formed in the member 76. The two members 74 and 76 are joined, for example by bolts 86, at the points where the depressions 82 and 84 meet.

An exactly similar arrangement is used to rigidly support the spindle 44.

This bicycle has been designed for use with small diameter wheels, following a current trend, and it is for this reason that a resilient suspension has been provided for the front and rear wheels, otherwise the ride would be very bumpy due to the fact that small wheels tend to follow every depression in the road much more closely.

To assemble the bicycle the transmission unit 32 is inserted into the main frame by firstly passing the saddle post 68 through a hole 88 in the top shell 10 and sliding the whole unit upwards until it is in the position shown in FIGURE 3. Bolts 90 are passed through corresponding holes which have been formed in the housing 34 and the shells 10 and 11.

The use of a unitary transmission unit and rear wheel suspension has advantages, in that the entire unit and saddle support is one basic assembly which can be used in bicycles of varying designs employing various different styles of main frame structures of different sizes and shapes, as well as frames fabricated from the different structural materials.

An arcuate rear inner liner 92 is secured inside the top shell 10 to act as a mud-guard against mud and stones which are thrown up by the rear wheel 52.

When the transmission unit 32 has been bolted into the main frame, detachable side panels 94 and 96 are then fastened to the rear of the top shell 10 by means of bolts 98 so as to enclose the transmission unit. As shown in FIGURE 7 the lower edges of the front of the two panels 94 and 96 abut each other and may be held together by means of clips (not shown). This abutment continues back until just in front of the rear wheel 52, when the lower edges flare outwards to allow the rear wheel to pass between them.

The saddle post 68 is also telescopic and has a section 98, slidable in it, carrying a saddle 100, being lockable at any position by a quick release lock 102.

A carrier 104 may be added, being attached at its front to the rear of the saddle post 68 at the point 106 and fastened at its rear end to the rear of the main bicycle frame.

Front and rear lights 108 and 110 respectively, and their power sources are carried in the main frame. Switches for these lights may be grouped on a control panel 112 formed on a top face of the main frame. This control panel may also include a speedometer which is connected in known manner to one of the wheels.

Brakes for the bicycle are preferably in the form of a back-pedal brake carried in the rear wheel hub, though cable operated caliper brakes may also be used.

The bicycle illustrated is shown to have conventional spoked wheels, but the use is envisaged of disc wheels made from resin bonded fiberglass.

Having described my invention, I claim:

1. A bicycle comprising an elongate frame, a front wheel mechanism supported at the front end of said frame, a mechanism unit comprising a rigid housing, a drive mechanism supported by said housing, a rearwardly extending wheel fork, transverse pivot means in said housing for supporting the front end of said fork and for biasing the rear end thereof downwardly, a saddle supported on said bicycle at a point forwardly of said rear wheel, and means for removably securing said mechanism unit in said frame.

2. A bicycle comprising a frame, said frame consisting of an elongated upper member of inverted U-shaped cross section extending substantially throughout the length of said bicycle, a rear wheel suspension and drive mechanism including a rear wheel mounted in the mechanism unit, a saddle supported on said bicycle at a point forwardly of said rear wheel, lower frame members having portions extending across between the edges of the arms of the U-shaped upper member at the forward part of said frame and downwardly around the rear wheel suspension and means for removably securing said mechanism unit in said frame.

3. A bicycle according to claim 2 in which the lower frame comprises a first portion having a U-shaped cross section underlying the forward part of the upper member and forming therewith a hollow front structural part of said frame, and a second portion comprising skirts extending downwardly on opposite sides of and enclosing the unitary assembly of said rear wheel suspension and drive mechanism, both of said portions of said lower frame being secured to the upper frame member along the edges of the arms of the inverted U-shaped upper member.

4. A bicycle according to claim 1 in which the rear wheel suspension and drive mechanism unit comprises a mounting frame having spaced side plates, a pedal spindle journaled in said side plates, rearwardly extending arms on said mounting frame, a rear wheel journaled between and at the ends of said arms and drive means connecting said pedal spindle and said rear wheel.

5. A bicycle according to claim 4 in which the rearwardly extending arms are pivotally connected to said mounting frame and means for biasing the rear ends of said arms downwardly.

6. A bicycle according to claim 5 in which the biasing means is a torsion member acting between said mounting frame and said rearwardly extending arms, and means for connecting said torsion member to said mounting frame including an adjustable member for varying the bias on said torsion member.

7. A bicycle according to claim 5 having a saddle post carried by and extending upwardly from said mounting frame at a position forwardly of the pivotal connection of said arms to said mounting frame.

8. A bicycle according to claim 1 in which the rear wheel suspension and drive mechanism unit comprises a mounting frame having spaced side plates, a pedal spindle journaled in said plates, an intermediate spindle journaled in said plates, rearwardly extending arms on said mounting frame, a rear wheel journaled in the ends of said arms and drive means connecting said pedal spindle to said intermediate spindle and said intermediate spindle to said rear wheel.

References Cited

UNITED STATES PATENTS

| | | | |
|---|---|---|---|
| 739,034 | 9/1903 | Travis | 280—283 |
| 2,378,961 | 6/1945 | Wallace et al. | 280—281 |
| 2,545,142 | 3/1951 | Falchetto | 280—281 |
| 2,755,873 | 7/1956 | Klaue | 280—281 X |
| 2,756,071 | 7/1956 | Riva | 280—284 |
| 2,854,249 | 9/1958 | Jaulmes | 280—281 |
| 3,030,124 | 4/1962 | Holloway | 280—281 |

FOREIGN PATENTS 1,127,761   10/1956   France.

KENNETH H. BETTS, *Primary Examiner.*